United States Patent
Janier et al.

(10) Patent No.: US 9,604,538 B2
(45) Date of Patent: Mar. 28, 2017

(54) VEHICLE PROVIDED WITH AN ENGINE AT THE REAR AND HAVING AN IMPROVED CLUTCH SYSTEM

(71) Applicant: RENAULT s.a.s., Boulogne-Billancourt (FR)

(72) Inventors: Benoit Janier, Chaville (FR); Vincent Blondeau, Chartres (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/412,575

(22) PCT Filed: Apr. 8, 2013

(86) PCT No.: PCT/FR2013/050759
§ 371 (c)(1),
(2) Date: Jan. 2, 2015

(87) PCT Pub. No.: WO2014/006284
PCT Pub. Date: Jan. 9, 2014

(65) Prior Publication Data
US 2015/0165902 A1  Jun. 18, 2015

(30) Foreign Application Priority Data
Jul. 3, 2012  (FR) ...................... 12 56372

(51) Int. Cl.
*B60K 23/02*  (2006.01)
*B60K 11/02*  (2006.01)
(Continued)

(52) U.S. Cl.
CPC ............... *B60K 23/02* (2013.01); *B60K 5/00* (2013.01); *B60K 11/02* (2013.01); *F16D 2048/0224* (2013.01)

(58) Field of Classification Search
None
See application file for complete search history.

(56) References Cited

U.S. PATENT DOCUMENTS 4,098,327 A * 7/1978 Reato ............................ 165/76
5,333,679 A * 8/1994 Suzuki et al. ................. 165/43
(Continued)

FOREIGN PATENT DOCUMENTS

| DE | 102013203593 A1 * | 9/2014 |
| JP | 2006 17270 | 1/2006 |
| WO | 2004 042246 | 5/2004 |

OTHER PUBLICATIONS

International Search Report Issued Jun. 25, 2013 in PCT/FR13/050759 Filed Apr. 8, 2013.
(Continued)

*Primary Examiner* — J. Allen Shriver, II
*Assistant Examiner* — Hilary L Johns
(74) *Attorney, Agent, or Firm* — Oblon, McClelland, Maier & Neustadt, L.L.P.

(57) ABSTRACT

A vehicle including an engine at a rear, and a clutch system including a hydraulic conduit passing below the vehicle and connecting a master cylinder placed at the front of the vehicle and a slave cylinder located at the rear thereof. The hydraulic conduit is positioned in a vicinity of a pre-existing heat source in the vehicle, to be heated by the heat source.

15 Claims, 1 Drawing Sheet

(51) Int. Cl.
*B60K 5/00* (2006.01)
*F16D 48/02* (2006.01)

(56) References Cited

U.S. PATENT DOCUMENTS

| | | |
|---|---|---|
| 7,069,983 B2 * | 7/2006 | Yakumaru et al. ............ 165/202 |
| 7,264,046 B1 * | 9/2007 | Futernik et al. .............. 165/202 |
| 2002/0162644 A1 * | 11/2002 | Futernik et al. ................ 165/43 |
| 2008/0053736 A1 * | 3/2008 | Yasuda et al. ....... B60K 7/0015 180/291 |

OTHER PUBLICATIONS

French Search Report Issued Nov. 30, 2012 in French Application No. 1256372 Filed Jul. 3, 2012.

\* cited by examiner

VEHICLE PROVIDED WITH AN ENGINE AT THE REAR AND HAVING AN IMPROVED CLUTCH SYSTEM

BACKGROUND

The invention relates to a vehicle provided with an engine at the rear and having an improved clutch system.

With reference to FIG. 1, a vehicle 1 provided with an engine 2 at the rear AR comprises a clutch system 3 comprising a clutch pedal 4, a clutch master cylinder 5 connected to a brake fluid reservoir 6, hydraulic conduits 7 and a clutch slave cylinder 8. The clutch pedal 4, the clutch master cylinder 5 and the brake fluid reservoir 6 are placed at the front AV of the vehicle 1, whilst the clutch slave cylinder 8 is located at the rear AR of the vehicle 1 in the vicinity of the engine 2. The hydraulic conduits 7 connect the clutch master cylinder 5 to the clutch slave cylinder 8, passing below the bodywork of the vehicle and being oriented along a longitudinal axis of the vehicle. Pressure exerted on the clutch pedal 4 by the driver of the vehicle actuates the clutch master cylinder 5 which produces pressure on the brake fluid located in the hydraulic conduits 7. This pressure then causes the displacement of this fluid in the conduits 7, immediately causing the actuation of the clutch slave cylinder 8 to provide the operation of the clutch.

A recurring problem encountered with this type of vehicle is that the hydraulic conduits are placed below the bodywork of the vehicle and that they are directly subjected to the external weather conditions. Thus, when the weather is extremely cold when temperatures may drop below −25° C., said conduits are subjected to significant cooling which is liable to cause the fluid circulating in the clutch system to become more dense. This results in significant damage to the clutch system which becomes difficult to operate, or even completely non-operational, due to the fluid which is not able to move easily in the hydraulic conduits.

BRIEF SUMMARY

The vehicles according to the invention, which are provided with an engine at the rear, have a clutch system which operates in all types of weather, said system being configured so as not to be subjected to the consequences of a very low external temperature. In this manner, a vehicle according to the invention may be used whatever the weather conditions, maintaining an operational clutch system, in particular in very cold weather.

The subject of the invention is a vehicle provided with an engine to the rear, said vehicle being equipped with a clutch system comprising a hydraulic conduit passing below the vehicle and connecting a master cylinder placed at the front of said vehicle and a slave cylinder located at the rear thereof. The principal feature of a vehicle according to the invention is that the hydraulic conduit is positioned in the vicinity of a pre-existing heat source in the vehicle, so as to be heated by said source. In other words, the hydraulic conduit is arranged below the vehicle, so as to be subjected to the influence of a heat source which is already present below the vehicle and is not specifically designed to heat up any of said conduits. In this manner, even in very cold weather when the temperatures are largely negative, the clutch system of a vehicle according to the invention remains fully operational. This pre-existing heat source may take any form, consisting, for example, of a heated metal area of the bodywork or a fluid circulation pipe. The pre-existing heat source results from a normal operation of a fluid circuit or a component of the vehicle which is outside the clutch system. The heating of the hydraulic conduit may take place either by radiation or by conduction or by convection. The term "in the vicinity" simply means that the hydraulic conduit is located sufficiently close to the heat source to be subjected to the thermal effects, either forming a very small gap relative to said source or being in contact therewith. To be effective over quite a short period of time, in the order of a few minutes, this heat source has to be brought to a temperature which is greater than or equal to 50° C. and preferably greater than 100° C.

Advantageously, the pre-existing heat source is a fluid circulation pipe. Advantageously, the fluid is water. During the operating phase of the vehicle, the fluid is at least temporarily brought to a high temperature when it is used in its original function. The principle of a vehicle according to the invention is that it is designed to be able to benefit from this heat source and thus heat up the hydraulic conduit of the clutch system.

According to a first preferred embodiment of a vehicle according to the invention, the pipe forms part of a cooling circuit of the engine and connects a radiator to said engine. More specifically, it is the pipe which supplies water from the engine to the radiator, said water having been previously heated by the engine.

According to a second preferred embodiment of a vehicle according to the invention, the pipe forms part of an air-conditioning circuit and is placed at the outlet of a compressor. More specifically, the fluid is then brought to a high temperature and may then be used to heat up the hydraulic conduit.

Preferably, the pipe forms a gap relative to the hydraulic conduit. To achieve this configuration, the heating of the hydraulic conduit is generally carried out by radiation. The fact that the pipe forms a gap relative to the hydraulic conduit means that it is not in contact therewith but it is placed at a reasonable distance, in the order of one centimetre, permitting effective and rapid heating of said conduit.

According to a further preferred embodiment of a vehicle according to the invention, the pipe is in contact with the hydraulic conduit. To achieve this configuration, the transfer of heat is carried out largely by conduction and permits a more rapid rise in temperature of the hydraulic conduit than that proposed by a remote transfer, generally by radiation.

Preferably, the pipe and the hydraulic conduit are coaxial. This is the most efficient configuration in terms of heating the hydraulic conduit, since virtually all of the heat emitted by the pipe is used to heat the hydraulic conduit. This configuration is also very space-efficient, as the pipe and the conduit are not placed side-by-side but are incorporated within one another. For this embodiment, the pipe may either be placed around the hydraulic conduit or be surrounded thereby.

Preferably, the hydraulic conduit and the heating pipe extend below the vehicle along a longitudinal axis of the vehicle in the heating zone. The heating zone is delimited by the length of the pipe which is directly used for heating the hydraulic conduit. This arrangement of the conduit and the heating pipe below the bodywork of the vehicle is able to be put in place in a simple and rapid manner, whilst remaining efficient relative to the desired object of the invention.

Advantageously, the hydraulic conduit is made of plastics material. This material is preferred for reducing the weight of the vehicle. However, a metal such as steel could also be suitable within the context of a vehicle according to the invention.

Preferably, the heating pipe is made of plastics material. This material is also selected so as to reduce the overall weight of the vehicle. Alternatively, a metal could be substituted for plastics material to ensure the heating of the hydraulic conduit.

The vehicles according to the invention have the advantage of having an improved clutch system, without the addition of further parts or a fundamental redesign of the vehicle. Said vehicles also have the advantage of using a source of heat which is already present in the vehicle, avoiding having to put in place a new source of energy which is liable to involve additional costs. The vehicles according to the invention are more sophisticated than vehicles which already exist, whilst the space requirement and costs remain the same. Finally, they have the advantage of using a mechanism for heating the hydraulic conduit which is simple and well-controlled, thus guaranteeing a safe and reliable clutch system.

BRIEF DESCRIPTION OF THE DRAWINGS

A detailed description of a preferred embodiment of a vehicle according to the invention will be given hereinafter, with reference to FIGS. 1 and 2.

DETAILED DESCRIPTION

Figure 1:
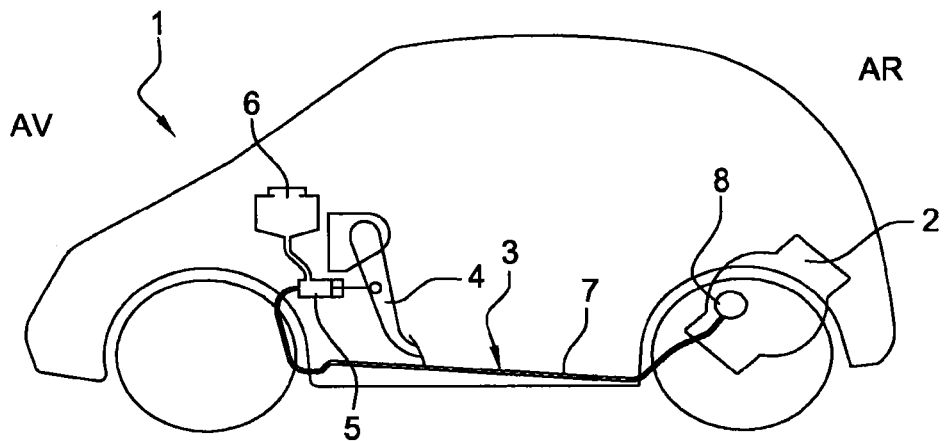
FIG. 1 is a simplified view from the side of a vehicle according to the prior art and provided with an engine to the rear.

FIG. 1 has already been described. The elements common to FIG. 1 and FIG. 2 retain the same reference numerals.

Figure 2:
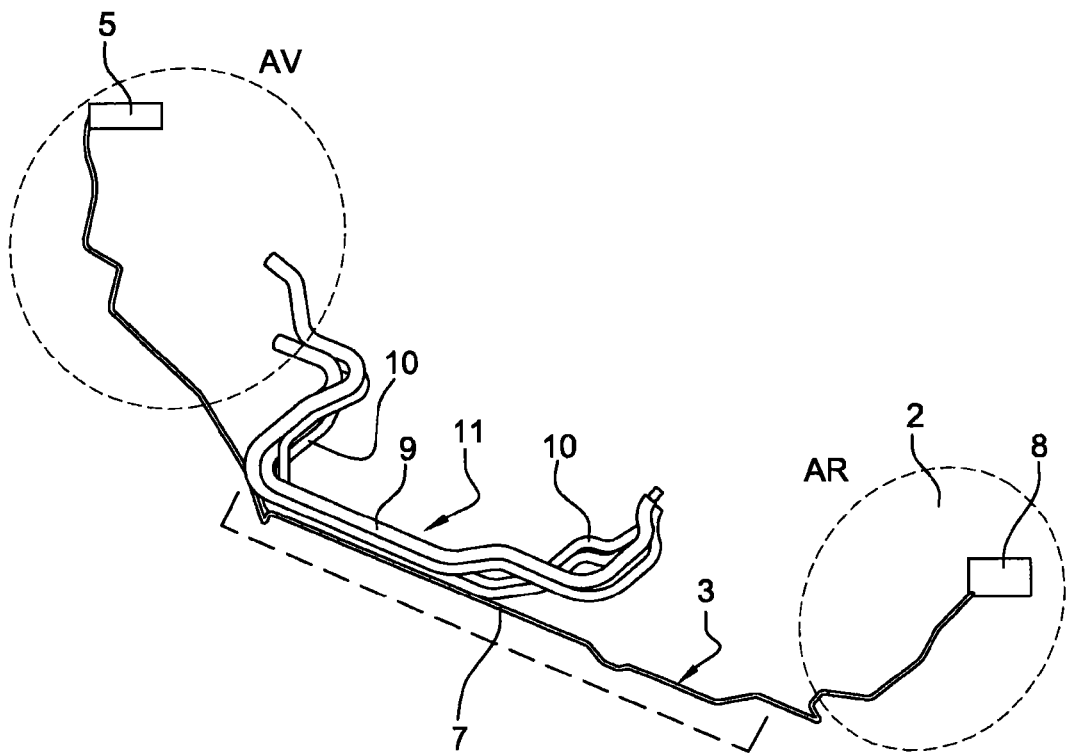
FIG. 2 is a partial perspective view of a heating pipe and a hydraulic conduit forming part of a clutch system of a vehicle according to the invention.

With reference to FIG. 2, a vehicle according to the invention has an engine 2 at the rear AR, a clutch system 3 and a cooling system 11 of said engine 2. The clutch system 3 comprises a hydraulic conduit 7 made of plastics material, connecting the clutch master cylinder 5 located at the front AV of the vehicle and the clutch slave cylinder 8 placed at the rear AR of said vehicle, in the vicinity of the engine 2. The cooling circuit 11 of the engine 2 comprises a first pipe 10 for circulating cold water made of plastics material, passing from a radiator to the engine 2, and a second pipe 9 for circulating hot water made of plastics material, permitting water which has been heated by the engine 2 to be conducted to the radiator. When the engine 2 arrives at its operating temperature, approximately ten minutes after start-up, the second pipe 9 for circulating hot water may reach between 100° C. and 120° C. The hydraulic conduit 7 of the clutch system 3 and the second pipe 9 for circulating hot water are arranged below the bodywork of the vehicle such that the hydraulic conduit 7 extends along a longitudinal axis of the vehicle and such that at least one segment of said second pipe 9 also extends along a longitudinal axis of the vehicle, being placed in contact with the hydraulic conduit 7. By this means, when the second pipe 9 for hot water is brought to a temperature of between 100° C. and 120° C. by the water which circulates inside said second pipe and which has been previously heated by the engine 2, the hydraulic conduit 7 of the clutch system 3 also starts to heat up by conduction. Thus, in very cold weather, when the outside temperature is lower than –20° C., the clutch system 3 of a vehicle according to the invention remains fully operational, using a liquid which is completely fluid and able to actuate the clutch slave cylinder 8 without any difficulty.

The invention claimed is:

1. A vehicle comprising:
   an engine at a rear of the vehicle;
   a clutch system comprising a hydraulic conduit including a portion passing below bodywork of the vehicle and connecting a master cylinder placed at a front of the vehicle and a slave cylinder located at the rear the vehicle;
   a pre-existing heat source positioned below the bodywork of the vehicle,
   wherein the portion of the hydraulic conduit passing below the bodywork of the vehicle is positioned in a vicinity of the pre-existing heat source such that there is a small gap between the heat source and the portion of the hydraulic conduit to heat the portion of the hydraulic conduit by the heat source.

2. A vehicle according to claim 1, wherein the pre-existing heat source is a fluid circulation pipe.

3. A vehicle according to claim 2, wherein the pipe forms part of a cooling circuit of the engine and connects a radiator to the engine.

4. A vehicle according to claim 2, wherein the pipe forms part of an air-conditioning circuit and is placed at an outlet of a compressor.

5. A vehicle according to claim 2, wherein the pipe forms the small gap with the portion of the hydraulic conduit.

6. A vehicle according to claim 5, wherein the gap between the pipe and the hydraulic conduit is 1 cm.

7. A vehicle according to claim 2, wherein the pipe is in contact with the portion of the hydraulic conduit.

8. A vehicle according to claim 2, wherein the pipe and the portion of the hydraulic conduit are coaxial.

9. A vehicle according to claim 2, wherein the portion of the hydraulic conduit and the pipe extend below the vehicle along a longitudinal axis of the vehicle in the heating zone.

10. A vehicle according to claim 2, wherein the pipe is made of plastics material.

11. A vehicle according to claim 1, wherein the hydraulic conduit is made of plastics material.

12. A vehicle according to claim 1, wherein the pre-existing heat source is brought to a temperature that is greater than or equal to 50° C. during operation of the vehicle.

13. A vehicle according to claim 1, wherein the pre-existing heat source is brought to a temperature that is between 100° C. and 120° C. during operation of the vehicle.

14. A vehicle according to claim 2, wherein water circulates through the pipe.

15. A vehicle comprising:
    an engine at a rear of the vehicle;
    a clutch system comprising a hydraulic conduit including a portion passing below bodywork of the vehicle and connecting a master cylinder placed at a front of the vehicle and a slave cylinder located at the rear the vehicle;
    a pre-existing heat source positioned below the bodywork of the vehicle,
    wherein the portion of the hydraulic conduit passing below the bodywork of the vehicle is positioned in a vicinity of the pre-existing heat source such that the heat source is in contact with the portion of the hydraulic conduit to heat the portion of the hydraulic conduit by the heat source.

* * * * *